US009571562B2

United States Patent
Versteyhe et al.

(10) Patent No.: US 9,571,562 B2
(45) Date of Patent: Feb. 14, 2017

(54) SYSTEM AND METHOD FOR DATA COLLECTION AND ANALYSIS USING A MULTI-LEVEL NETWORK

(71) Applicant: Dana Limited, Maumee, OH (US)

(72) Inventors: Mark R. J. Versteyhe, Oostkamp (BE); Matthias W. J. Byltiauw, Hooglede (BE)

(73) Assignee: Dana Limited, Maumee, OH (US)

( * ) Notice: Subject to any disclaimer, the term of this patent is extended or adjusted under 35 U.S.C. 154(b) by 413 days.

(21) Appl. No.: 14/210,719

(22) Filed: Mar. 14, 2014

(65) Prior Publication Data
US 2014/0280593 A1 Sep. 18, 2014

Related U.S. Application Data

(60) Provisional application No. 61/793,525, filed on Mar. 15, 2013.

(51) Int. Cl.
*H04L 29/08* (2006.01)
*H04W 4/00* (2009.01)
(Continued)

(52) U.S. Cl.
CPC .............. *H04L 67/10* (2013.01); *G06Q 10/06* (2013.01); *H04L 67/12* (2013.01); *H04W 4/006* (2013.01);
(Continued)

(58) Field of Classification Search
CPC ......... H04L 67/10; H04L 67/12; H04W 4/006; H04W 4/046; G08G 1/0133; G08G 1/0112; G06Q 10/06; G06Q 10/0631; G06Q 10/00
(Continued)

(56) References Cited

U.S. PATENT DOCUMENTS 6,246,960 B1 * 6/2001 Lin ...................... G01C 21/165
                                                   701/472
2005/0021201 A1 * 1/2005 Klotz .................... B60W 30/16
                                                   702/189

FOREIGN PATENT DOCUMENTS

| CN | 102692223 A | 9/2012 |
| EP | 2196973 A1 | 6/2010 |
| GB | 2487435 A | 7/2012 |

OTHER PUBLICATIONS

International Search Report and Written Opinion for application No. PCT/US2014/027211, mailing date Sep. 4, 2014.
(Continued)

*Primary Examiner* — Tu Nguyen
(74) *Attorney, Agent, or Firm* — Marshall & Melhorn, LLC

(57) ABSTRACT

A system and a method for data collection and analysis that uses a multi-level network are provided. The system comprises a first client device and a central network. The first client device and the central network form the multi-level network. The first client device is configured to receive a first data and perform a first data fusing process based on the first data. The first data fusing process generates a second data. The central network is in communication with the first client device. The central network receives the second data from the first client device. The central network is configured to perform a second data fusing process based on the second data to generate a third data. The third data is communicated to the first client device so that the first client device can perform a third data fusing process based on the third data to generate a fourth data.

17 Claims, 5 Drawing Sheets

(51) Int. Cl.
 H04W 4/04 (2009.01)
 G06Q 10/06 (2012.01)
 G08G 1/01 (2006.01)
(52) U.S. Cl.
 CPC ............ *H04W 4/046* (2013.01); *G08G 1/0112* (2013.01); *G08G 1/0133* (2013.01)
(58) Field of Classification Search
 USPC ........................................................ 709/204
 See application file for complete search history.

(56) References Cited

OTHER PUBLICATIONS

Yan Zhou et al: "Unscented Kalman Filtering based quantized innovation fusion for target tracking in WSN with feedback", Machine Learning and Cybernetics, 2009; International Conference on, IEEE, Piscataway, NJ, USA, Jul. 12, 2009 (Jul. 12, 2009), pp. 1457-1463, XP031517887.

Kazuya Kosugi et al: "Dynamic target navigation based on multisensor Kalman filtering and neighbor discovery algorithm", SICE Annual Conference (SICE), 2011 Proceedings of, IEEE, Sep. 13, 2011 (Sep. 13, 2011), pp. 1392-1397, XP032065163.

Dong-Hua Chen et al: "Sensor Network Based Synchronous Lifting Technology in Bridge Reconstruction", E-Product E-Service and E-Entertainment (ICEEE), 2010 International Conference on, IEEE, Piscataway, NJ, USA, Nov. 7, 2010 (Nov. 7, 2010), pp. 1-4, XP031829230.

Ling Shi et al: "Change sensor topology when needed: How to efficiently use system resources in control and estimation over wireless networks", Proceedings of the 46th IEEE Conference on Decision and Control : New Orleans, LA, Dec. 12-14, 2007, IEEE, Piscataway, NJ, USA, Dec. 1, 2007 (Dec. 1, 2007), pp. 5478-5485, XP031205676.

Ming Yang et al: "A Surveillance Testbed with Networked Sensors for Integrated Target Inference",Testbeds and Research Infrastructure for the Development of Networks and Communities, 2007. Tridentcom 2007. 3rd International Conference on, IEEE, PI, May 1, 2007(May 1, 2007), pp. 1-10, XP031211398.

Alhakeem S et al: "A unified approach to the design of decentralized detection systems" IEEE Transactions on Aerospace and Electronic Systems, IEEE Service Center, Piscataway, NJ, US, vol. 31, No. 1, Jan. 1, 1995 (Jan. 1, 1995), pp. 9-20, XP011290583.

Wee Peng Tay et al: "The value of feedback for decentralized detection in large sensor networks", International Symposium on Wireless and Pervasive Computing, Feb. 1, 2011 (Feb. 1, 2011), pp. 1-6, XP055136175, DOI: 10.1109/ISWPC.2011.5751320.

Ribeiro A et al: "Kalman Filtering in Wireless Sensor Networks", IEEE Control Systems Magazine, IEEE Sewrvice Center, Piscataway, NJ, US, vol. 30, No. 2, Apr. 1, 2010 (Apr. 1, 2010), pp. 66-86, XP011305814, ISSN: 0272-1708.

Sunitha Kopparthi et al: "Performance of Parallel Decentralized Sensor Network with Decision Feedback", Wireless Pervasive Computing, 2007. ISWPC '07. 2nd International Symposium on, IEEE, PI, Feb. 1, 2007 (Feb. 1, 2007), XP031072514.

Pietro Ciciriello et al: "Building virtual sensors and actuators over logical neighborhoods", Proceedings of the International Workshop on Middleware for Sensor Networks, MIDSENS '06, Jan. 1, 2006 (Jan. 1, 2006), pp. 19-24, XP055136320, New York, New York, USA; DOI: 10.1145/1176866.1176870.

\* cited by examiner

SYSTEM AND METHOD FOR DATA COLLECTION AND ANALYSIS USING A MULTI-LEVEL NETWORK

RELATED APPLICATIONS

The present application claims the benefit to U.S. Provisional Application No. 61/793,525 filed on Mar. 15, 2013, which is incorporated herein in its entirety by reference.

FIELD OF THE INVENTION

The present invention relates to data collection and analysis, and more specifically to a system and a method for data collection and analysis using a multi-level network.

BACKGROUND OF THE INVENTION

Data collection techniques and analysis typically rely on large amounts of data entry and data manipulation. A large portion of data entry and data manipulation is performed manually, and is very time consuming. As a non-limiting example, data related to a repeated process (such as a duration thereof or an occurrence of an event) is typically entered manually during the repeated process or shortly after the repeated process occurs. Manual data entry and analysis is prone to error, may be distracting in particular instances, and is not an efficient use of skilled labor.

Systems used to perform data collection and analysis tend to be complex and cost prohibitive. Such systems typically employ proprietary hardware and are limited in configuration and in how data is able to be collected. Additionally, improvements that may be afforded to a process or a system by an analysis of collected data typically require complex and costly adjustments.

It would be advantageous to develop a system and a method for data collection and analysis that uses a multi-level network that automates a substantial portion of data collection and analysis, is adaptable for a wide variety of platforms and devices, and allows for improvements afforded by data analysis to be easily implemented.

SUMMARY OF THE INVENTION

Presently provided by the invention, a system and a method for data collection and analysis that uses a multi-level network that automates a substantial portion of data collection and analysis, is adaptable for a wide variety of platforms and devices, and allows for improvements afforded by data analysis to be easily implemented, has surprisingly been discovered.

In one embodiment, the present invention is directed to a method for data collection and analysis using a multi-level network. The steps of the method comprise providing a central network, providing a first client device in communication with the central network, the first client device and the central network forming the multi-level network, receiving at the first client device a first data, performing a first data fusing process using the first client device based on the first data to generate a second data, communicating the second data from the first client device to the central network, performing a second data fusing process using the central network based on the second data from the first client device to generate a third data, communicating the third data from the central network to the first client device, and performing a third data fusing process using the first client device based on the third data from the central network to generate a fourth data.

In another embodiment, the present invention is directed to a system for data collection and analysis using a multi-level network. The system comprises a first client device and a central network. The first client device and the central network form the multi-level network. The first client device is configured to receive a first data and perform a first data fusing process based on the first data. The first data fusing process generates a second data. The central network is in communication with the first client device. The central network receives the second data from the first client device. The central network is configured to perform a second data fusing process based on the second data to generate a third data. The third data is communicated to the first client device so that the first client device can perform a third data fusing process based on the third data to generate a fourth data.

In yet another embodiment, the present invention is directed to a system for data collection and analysis using a multi-level network. The system comprises a vehicle, an infrastructure, a warehouse management system, and a central network. The central network is in communication with the vehicle, the infrastructure, and the warehouse management system to form the multi-level network. The vehicle is configured to receive a first data and perform a first data fusing process based on the first data. The first data fusing process generates a second data. The infrastructure is configured to receive a third data and perform a second data fusing process based on the third data. The second data fusing process generating a fourth data. The warehouse management system is configured to receive a fifth data and perform a third data fusing process based on the fifth data. The third data fusing process generates a sixth data. The central network receives at least one of the second data, the fourth data, and the sixth data. The central network is configured to perform a fourth data fusing process based on at least one of the second data, the fourth data, and the sixth data to generate a seventh data. The seventh data is communicated to at least one of the vehicle, the infrastructure, and the warehouse management system so that the at least one of the vehicle, the infrastructure, and the warehouse management system can perform a fifth data fusing process based on the seventh data to generate an eighth data.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
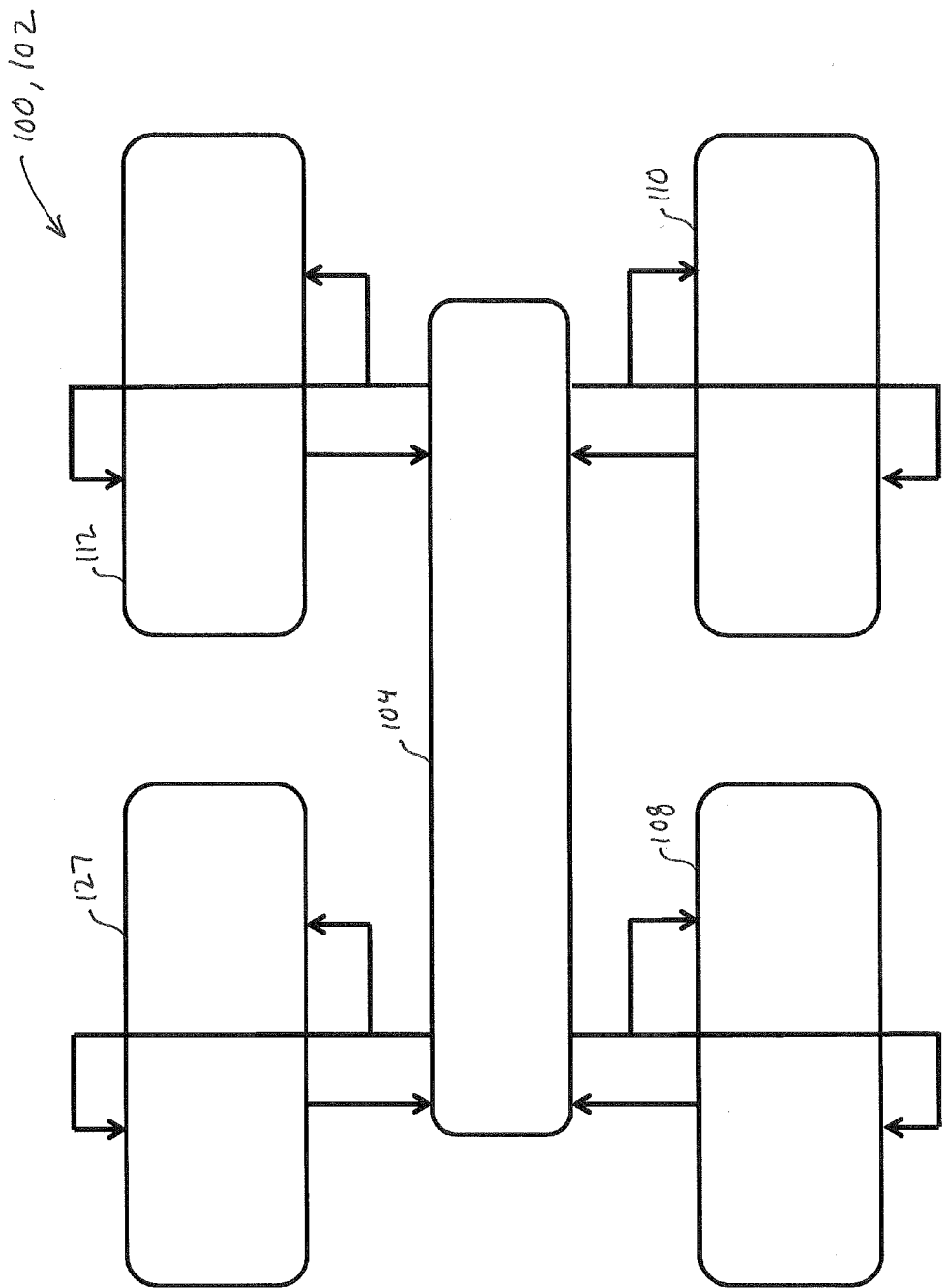
FIG. 1 is a schematic illustration of a system for data collection and analysis using a multi-level network according to an embodiment of the invention.

FIG. 1 schematically illustrates a system 100 which employs a method for data collection and analysis using a multi-level network 102. The system 100 and the method uses data fused information (local/centralized, stationary/mobile) and a central network 104 to enrich information. Information may be collected at a local level by a sensor 106 positioned in a mobile or a stationary manner. Further, the data may be shared or analyzed at a centralized location. The data may be transmitted for use by a user of the system 100, an operator of the system 100, an operator of a machine 108, a device in communication with the system 100, another system (such as a warehouse management system) in communication with the system 100, or the system 100 itself.

The system 100 and the method facilitates enriching information collected using a plurality of sensors 106 placed in a plurality of locations through a sensor fusion process. The sensor fusion process allows the information to be enriched to a greater degree than by solely collecting and analyzing information gathered from a single location. Additionally, the data fused information formed using the sensor fusion process may be transmitted to the central network 104 (which may be commonly referred to as a "cloud" style network). Once transmitted to the central network 104, further data fusion may occur to increase a quality or an amount of information.

Figure 2:
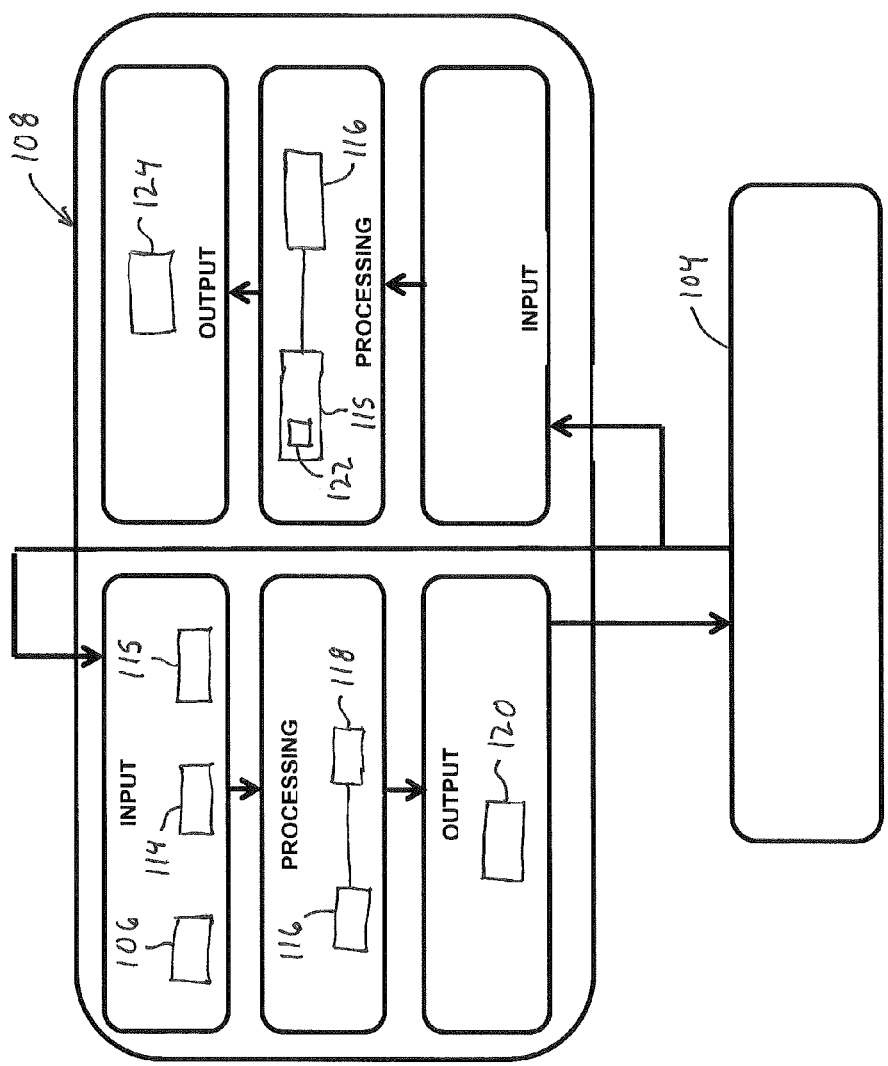
FIG. 2 is a schematic illustration of a machine forming a portion of the system for data collection and analysis illustrated in FIG. 1.

The data fused information may then be used to optimize the machine 108 (such as, but not limited to a vehicle), a warehouse management system 110, an infrastructure 112 of the system 100, or to provide a behavior feedback or information (such as task lists combined with map data and routing information, for example) to the operator of the machine 108. The behavior feedback may be used to increase a performance of the operator, a fuel efficiency of the machine 108 (by adjusting an operating procedure used by the operator), or to provide a feedback regarding a safety of the operator. The machine 108 is a client device in communication with the central network 104, forming the multi-level network 102. FIG. 2 illustrates a relationship of the machine 108 with the central network 104, and provides additional information on how data is transmitted to and from the machine 108.

FIG. 2 schematically illustrates information input at a sensor level of the machine. Such sensors 106 may be local, mobile sensors already existing in the machine 108 which may be combined with additional sensors and reference data such as geographical map data 114 (static or dynamic). Further, sensor data may be information that originates from a mobile wireless device 115 or from the central network 104 which provides information concerning the infrastructure 114 of the system 100, the warehouse management system 112, or the operator. Non-limiting examples of sensors 106 that may be used with the machine 108 are a wheel speed sensor, a vehicle speed sensor, a steering angle sensor, a mass load sensor, a gyroscope, a GPS sensor, an engine sensors, a fuel consumption sensor, a yaw rate sensor, a radar bucket position, a remaining useful life of oil, and a remaining useful life of clutch.

FIG. 2 schematically illustrates information processing of the machine 108. A local CPU 116 in communication with at least one sensor 106 performs a pre-processing of a raw data received from the at least one sensor 106 to create a richer set of data. As a non-limiting example, pulses from an encoder in communication with a wheel speed sensor may be processed to form a signal indicating RPM. A CPU 118 in communication with the local CPU 116 performs a data fusion to enrich the data, such as using a Kalman filter style algorithm. It is understood that the CPU 116 and the CPU 118 may be the same CPU, or that the CPU 116 and the CPU 118 may be separate from one another and in communication as described hereinabove. As a non-limiting example, information received regarding a combined steering angle, a wheel speed, a vehicle speed, a GPS location data, and a gyroscope data may be processed to form a robust, accurate and reliable vehicle positioning signal.

FIG. 2 schematically illustrates a virtual sensor 120 of the machine 108. The virtual sensor 120 is formed using the sensor fused data. The fusion causes the information to have more value than a sum of the information collected by individual sensors 106 alone. As non-limiting examples, a vehicle position, a vehicle speed, a vehicle task (pattern recognition of a loading, a lifting, a riding, and a y-cycle of the vehicle, for example), a dynamic map attribute, and a service information of the machine 108 may be the result of the virtual sensor 120.

FIG. 2 schematically illustrates the machine 108 receiving a fused data from the central network 104. The fused data from the central network 104 is received by the machine 108 without a need for interaction or request by the operator. Such interaction occurs at a level of the machine 108 of the system 100.

FIG. 2 schematically illustrates information processing of the machine 108. A CPU 122 (of the mobile wireless device 115, for example) in communication with the local CPU 116 performs a data fusion to enrich the fused data from the central network 104. As non-limiting examples, the CPU 122 may communicate with the local CPU 116 to signal to restrict fuel injection in an engine of the machine 108, to increase or reduce a resistance in a steering wheel of the machine 108 in a direction to avoid a collision, or to assist in guidance of the machine 108. The local CPU 116 is in communication with an actuator 124 translates a high level signal to a lower level signal.

FIG. 2 schematically illustrates an output at a level of the actuator 124 forming a portion of the machine 108. In response to information, the actuator 124 of the machine 108 is engaged or a system of the machine 108 is activated. As non-limiting examples, a throttle valve of the machine 108 may be adjusted or a choking valve of a hydraulic steering circuit of the machine 108 may be activated.

At a level of the machine 108 on the multi-level network 102, data collected from the plurality of sensors 106 is fused to enrich the data. The enriched data is then transmitted to the central network 104. As a non-limiting example of data enrichment, data may be collected from a vehicle gyroscope, a rotational speed of each of the wheels of the machine 108, and a global positioning signal to generate an accurate position estimation. The accurate position estimation may be generated using a Kalman filter style algorithm, for example.

In addition to positioning information, a task information of the machine 108 may also be transmitted to the central network 104. Non-limiting examples of the task information of the machine 108 are a weight of a load being picked up by the machine 108 (by fusing data from a vehicle hydraulic system with a data from a load cell), moving the machine 108 from a pick-up zone to a drop-off zone or from the drop-off zone to the pick-up zone, and loading the machine 108. The task information of the machine 108 is delivered in real-time without any substantial delay. It is understood that the term "without any substantial delay" means preferably within several seconds.

Once the accurate position estimation and the task information of the machine 108 are transmitted to the central network 104, the accurate position estimation and the task information of the machine 108 may be sensor fused with information that is available from the central network 104. As a non-limiting example, the information that is available from the central network 104 may be an offline map including annotations of the pick-up zones, the drop-off zones, a plurality of no-go-zones, and a location associated with an item to be moved. As a second non-limiting example, the information that is available from the central network 104 may be a dynamic adaptable map, which may be updated using information available from the central network 104.

Figure 3:
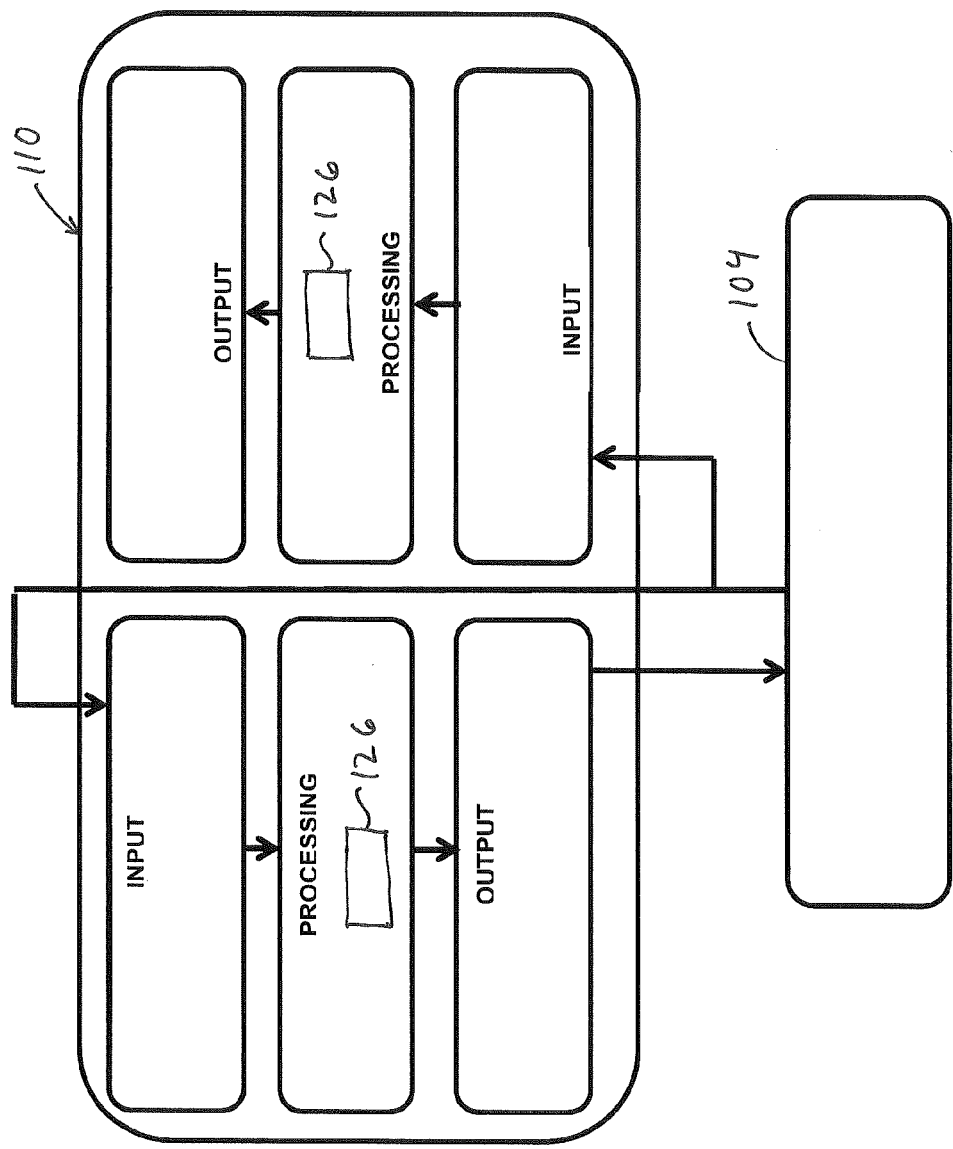
FIG. 3 is a schematic illustration of a warehouse management system forming a portion of the system for data collection and analysis illustrated in FIG. 1.

At a higher level of the multi-level network 102, the central network 104 performs a task of synchronizing all of the data that is transmitted thereto. Additionally, at the higher level, further data fusion can take place to further enrich the information sent out to the operator of the machine 108, the warehouse management system 110, the infrastructure 112 of the system 100, or another recipient. FIG. 3 illustrates a relationship of the warehouse management system 110 with the central network 104, and provides additional information on how data is transmitted to and from the warehouse management system 110.

FIG. 3 schematically illustrates information input to the warehouse management system 110. The information input to the warehouse management system 110 comprises information about logistics, the machine 108, the infrastructure 112 of the system 100, and the operator (such as maintaining track of operations, products, or traffic flow). Such information comes from the warehouse management system 110 and from the central network 104.

FIG. 3 schematically illustrates information processing of the warehouse management system 110. A CPU 126 of the warehouse management system 110 performs a data fusion to enrich the data. As a non-limiting example, information processing of the warehouse management system 110 is based on logistics and information received from the central network 104, such as traffic flow, geographical map data, and information needed to calculate an optimized route considering safety, productivity, and fuel economy.

FIG. 3 schematically illustrates information processing of the warehouse management system 110. The fused data generated by the CPU 126 of the warehouse management system is transmitted to the central network 104 for further data enrichment.

FIG. 3 schematically illustrates the warehouse management system 110 receiving a fused data from the central network 104. The fused and enriched data from the central network 104 is received by the warehouse management system 110. The fused and enriched data is relevant to the warehouse management system 110.

FIG. 3 schematically illustrates information processing of the warehouse management system 110. The CPU 126 performs a data fusion to enrich the data.

FIG. 3 schematically illustrates data output for the warehouse management system 110. Relevant data for the warehouse management system 110 is captured and may be used for data fusion. Non-limiting examples of relevant data for the warehouse management system 110 may be to perform fleet monitoring, to log productivity, or to determine service needs of a fleet of machines 108.

Communication between the operator of the machine 108, the warehouse management system 110, the infrastructure 112 of the system 100, the machine 108, and the central network 104 may be afforded through a mobile communication technology standard such as a 3G network or a 4G network. Alternately, it is understood that communication between the operator of the machine 108, the warehouse management system 110, the machine 108, and the central network 104 may be afforded through use of another type of wireless network.

At the level of the machine 108 on the multi-level network 102, the mobile wireless device 115 may be used as a user interface and a platform used with at least one specialized application. The mobile wireless device 115 may be a mobile phone, a personal media player, a tablet computer, a notebook computer, a global positioning system (GPS) device, an entertainment receiver installed in the vehicle, a personal digital assistant, a handheld gaming device, and an e-book reading device. Further, it is understood that other devices may be used. The mobile wireless device 115 may be configured to send and receive information from the operator, the central network 104, the infrastructure 112 of the system 100, and the machine 108 (such as through the use of an interface such as a controller area network "dongle").

The at least one specialized application may be specific in nature, and may reflect the machine 108 the operator uses. As a non-limiting example, the at least one specialized application may be a forklift truck application, a front end loader application, or another type of vehicle application. Further, it is understood that the at least one specialized application may be adapted for use with a non-moving piece of equipment. The at least one specialized application may be created using existing device platforms, which provides the advantages of compatibility, a robustness against system updates which may interfere with the at least one specialized application, and allows the operators or those unfamiliar with software development to assist in a development process of the at least one specialized application.

The mobile wireless device 115 allows the at least one specialized application to provide information to the operator of the machine 108. Three non-limiting examples of the information which may be provided to the operator of the machine 108 are logistics optimization, operator coaching, and infrastructure optimization.

With regards to logistics optimization, the at least one specialized application can suggest an optimized routing based on data fused information collected from the central network 104. The data fused information can be a location of other machines 108, a location of obstacles, a plurality of delivery locations, and a traffic congestion information, in addition to other information. The logistics optimization can be performed to improve a productivity of the machine 108 or the operator, improve a fuel economy of the machine 108, and to improve safety of an operating environment of the machine 108. As a non-limiting example, the logistics optimization can be applied to a front end loader used in a mining operation. The logistics optimization allows the front end loader to apply a just-in-time approach during a material loading to reduce an idling time of the machine 108, which increases a fuel economy of the machine 108.

Similar to the at least one specialized application, a scope of the logistics optimization may be extended to develop an application used with the warehouse management system 110. The data fused in the central network 104 may comprise logging a productivity of an entire fleet of the machines 108. Such data may provide a position of the machines 108 at a point in time together with an activity (such as loading a predetermined amount of a product, which was picked up at a given location), a condition of an operating environment, and other parameters like fuel efficiency. Additionally, the warehouse management system 110 may keep track of the complete logistics at any given moment of time and can use information from the complete logistics to optimize a given process. The warehouse management system 110 may also provide the operator with a personalized task sheet or by analyzing the drop-off zones, the warehouse management system 110 can suggest an optimized routing.

Figure 4:
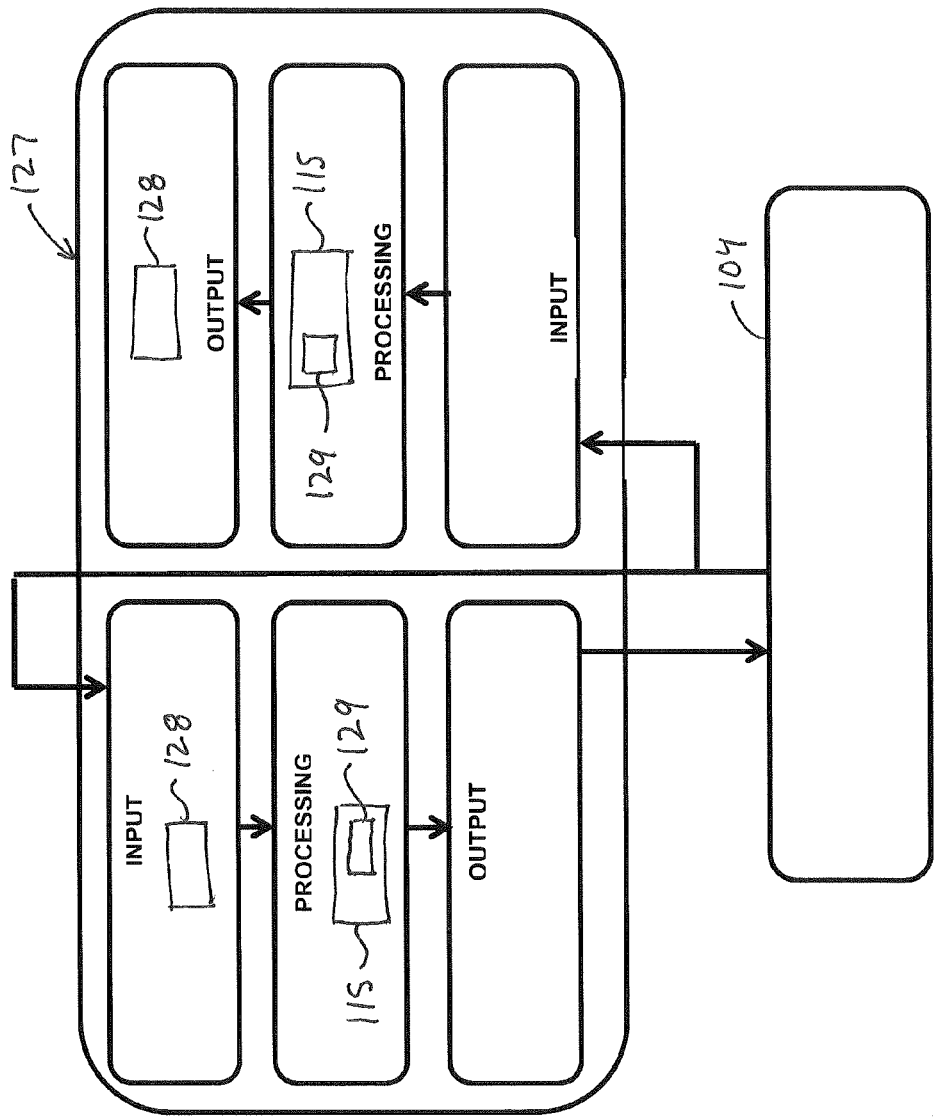
FIG. 4 is a schematic illustration of an interaction between an operator of a machine and the system for data collection and analysis illustrated in FIG. 1.

With regards to operator coaching, the at least one specialized application may be used to assist the operator of the machine 108 to operate the machine 108 in a more efficient manner. The at least one specialized application may assist the operator in how to accelerate the machine 108 in a proper manner, using a pattern recognition detection procedure to determine an operating mode of the machine and to adjust the machine 108 in response. FIG. 4 illustrates a relationship of an exemplary interaction between an operator 127, the machine 108, the mobile wireless device 115, at least one specialized application, and the central network 104, and provides additional information on how data is transmitted to and from the operator, the machine 108, the mobile wireless device 115, at least one specialized application, and the central network 104.

FIG. 4 schematically illustrates how information input from the operator 127 to the central network 104 is performed. The operator 127 enters the input through a user interface 128 (for example, from the mobile wireless device 115 in the machine 108) so that the input may be enriched and transmitted to the central network 104. As non-limiting examples, the input entered by the operator may concern the following:

1. Logistics—As a non-limiting example, the input may indicate that a given item may be picked up at a given location which is in turn delivered to another location or the input may indicate that a given item is out of stock
2. Infrastructure—As a non-limiting example, the input may indicate a dangerous situation on a surface the machine 108 traverses or the presence of an obstacle in a route of the machine 108
3. Action/Feedback—Upon receipt of information from the central network 104 (for example, a service request or an operator preference for optimized routing) the operator 127 may be required to enter input FIG. 4 schematically illustrates information processing in response to input from the operator 127. A CPU 129 of the mobile wireless device 115, the machine 108, or another device in communication with the system 100 performs a data fusion to enrich the data. It is understood that the CPU 122 and the CPU 129 may be the same CPU, forming a portion of the mobile wireless device 115, or that the CPU 122 and the CPU 129 may be separate from one another. As non-limiting examples, the CPU 129 may process the information to facilitate transferring the information through a wireless network or may combine the input from the operator 127 with other data available through the central network 104 such as the geographical map data 114, information about the machine 108, information about the infrastructure 112, information about the operator 127, or information about the warehouse management system 110.

FIG. 4 schematically illustrates the central network 104 receiving information from the operator 127. The fused data generated by the CPU 129 is transmitted to the central network 104 for further data enrichment.

FIG. 4 schematically illustrates the operator 127 receiving a fused data from the central network 104. The fused and enriched data from the central network 104 is intended for use by the operator 127. As non-limiting examples, the fused and enriched data from the central network 104 may be a task list, a suggestion for an optimized routing based on a preference of the operator 127, or operator coaching (for example, on how to accelerate the machine 108 in a proper manner, or to advise the operator 127 regarding a speed of the machine 108 in corners based on a current speed or a load of the machine 108).

FIG. 4 schematically illustrates information processing based on fused data from the central network 104 that occurs at the operator level of the system 100. The CPU 129 (which may form a portion of the mobile wireless device 115), the machine 108, or another device in communication with the system 100 performs a data fusion to enrich the data. As non-limiting examples, in response to a notification in the fused data, the CPU 129 may check a current activity on the machine 108 (such as a position of the machine and/or a task list of the machine 108) and if the current activity requires a full attention of the operator 127, the CPU 129 will determine that a notification to the operator is appropriate.

FIG. 4 schematically illustrates the user interface 128 receiving notifications for the operator 127. Relevant data for the operator 127 may be displayed on the user interface 128 as a notification to the operator 127 or the mobile wireless device 115 may produce a sound. Non-limiting examples that result in a notification on the user interface 128 may be a task list, a warning to the operator 127 regarding obstacles, an optimized routing proposal, or a warning to the operator 127 regarding a speed of the machine 108 in corners based on a current speed or a load of the machine 108.

As a non-limiting example, when the at least one specialized application recognizes that the machine 108 is operating at lower speeds, the at least one specialized application may provide the operator 127 with control having increased sensitivity. For instance, the at least one specialized application may provide the operator 127 with control having increased sensitivity when the machine 108 is operated in a typical off-highway Y-cycle. When the machine 108 dumps a load, it is very likely that a next operation of the machine 108 is to drive in reverse. The at least one specialized application can anticipate the next operation and begin to start engaging the reverse gear before the operator engages the reverse gear. While driving backwards in the typical off-highway Y-cycle, it is very likely that the operator 127 will lower a bucket of the machine 108 to be level with a surface the machine 108 is traversing. The at least one specialized application can anticipate this operation and assist in lowering the bucket of the machine 108.

In another example, the at least one specialized application can detect when the operator 127 is cornering at an increased speed or when the operator 127 is about to corner at a speed that is too great for the machine 108 (based on a current load of the machine 108). The at least one specialized application can assist the operator 127 in reducing the speed of the machine 108 by providing a notification when such a condition is present, and when needed, the at least one specialized application may interact with a throttle or a brake of the machine 108 to decrease the speed of the machine 108.

In another example, the at least one specialized application can prevent the machine 108 from operating in areas where a hazardous situation may occur. For example, in a harbor area or on a floor of a factory forklift trucks typically operate in close proximity to zones where a pedestrian may typically be located, where the machine 108 may be damaged, or where the operator 127 of the machine 108 may be injured. The at least one specialized application may fuse the accurate position estimation with the dynamic adaptable map (based on at least the geographical map data 114) to guide the machine 108 away from such zones by interacting with a steering wheel and/or the throttle of the machine 108.

The at least one specialized application may also facilitate meeting a service requirement of the machine 108. As a non-limiting example, the at least one specialized application can provide information on service of a part of the machine 108, retrieve statistical information about the service requirement of the machine 108, and the at least one specialized application may shut off notifications from the machine 108 or the mobile wireless device 115 when the operator 127 is dealing with a task requiring an increased concentration by the operator 127.

Figure 5:
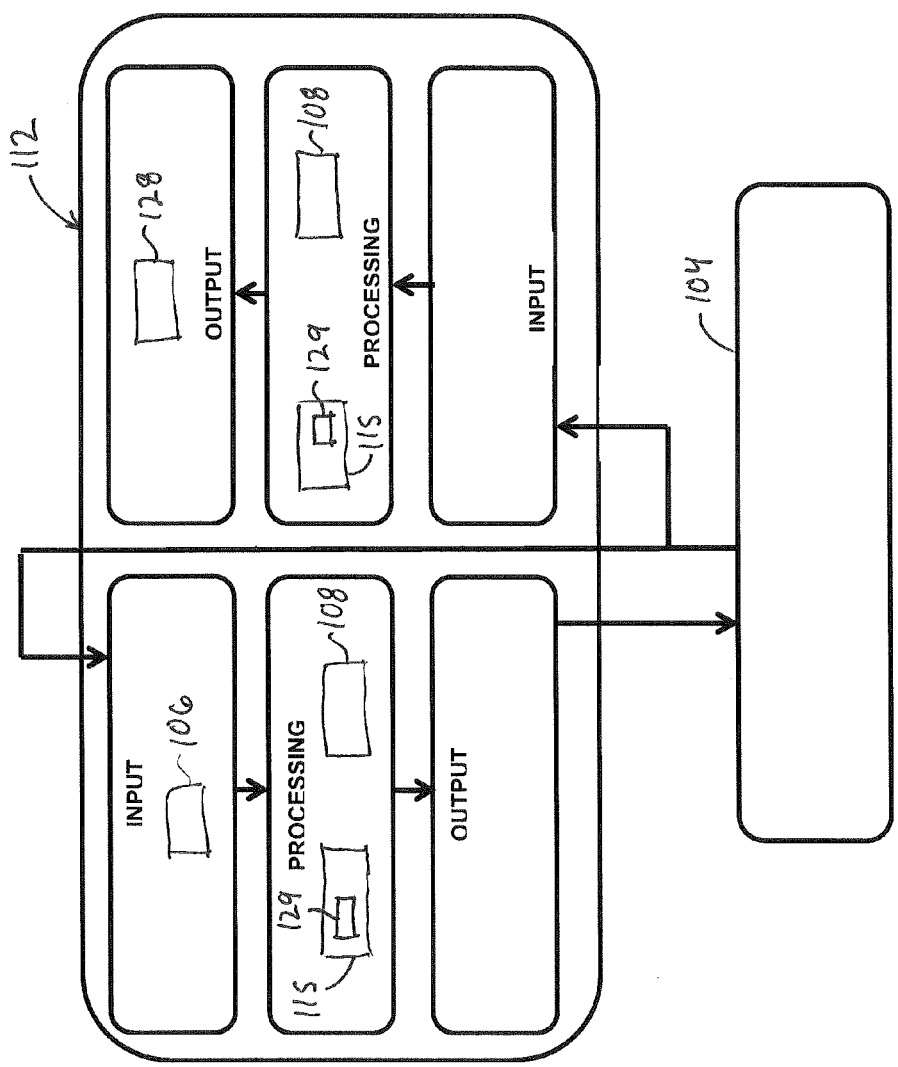
FIG. 5 is a schematic illustration of an infrastructure forming a portion of the system for data collection and analysis illustrated in FIG. 1.

With regards to optimization of the infrastructure 112, a higher level of the multi-level network 102 may monitor traffic and perform data mining. Such tasks can provide information which can be used to optimize the infrastructure 112. Non-limiting examples of the infrastructure are a factory, a construction site, a mining operation, or a harbor. FIG. 5 illustrates a relationship of the infrastructure 112 with the central network 104, and provides additional information on how data is transmitted to and from the infrastructure 112.

FIG. 5 schematically illustrates information input at a level of the sensors 106 of the infrastructure 112 of the system 100. The infrastructure 112 of the system 100 may be equipped with a plurality of sensors 106 (such as, for example, devices for detecting vehicles or traffic flow and RFID readers for logistics purposes). Additional data from the central network 104 may also be imported for use with the infrastructure 112 of the system 100.

FIG. 5 schematically illustrates information processing based on input from the sensors 106 for the infrastructure 112 of the system 100. The CPU 129 of the mobile wireless device 115, the machine 108, or another device in communication with the system 100 performs a data fusion to enrich the data. As non-limiting examples, the CPU 129 may process the information from the sensors 106 to facilitate transferring the information through a wireless network or may combine the input from the sensors 106 with other data available through the central network 104 such as the geographical map data 114, information about the machine 108, information about the infrastructure 112, information about the operator, or information about the warehouse management system 110.

FIG. 5 schematically illustrates an information input process from the infrastructure 112 to the central network 104. The fused data generated by the CPU 129 is transmitted to the central network 104 for further data enrichment. As non-limiting examples, enriched data may be with regards to a traffic flow or a logistics flow, such as if a given item is not available, then such information is communicated to the central network 104.

FIG. 5 schematically illustrates the infrastructure 112 receiving a fused data from the central network 104. The fused and enriched data from the central network 104 is received by the infrastructure 112 of the system 100. The fused and enriched data is relevant to the infrastructure 112 of the system 100.

FIG. 5 schematically illustrates information processing performed at the level of the infrastructure 112 based on fused data from the central network 104. The CPU 129 of the mobile wireless device 115, the machine 108, or another device in communication with the system 100 performs a data fusion to enrich the data.

FIG. 5 schematically illustrates the infrastructure 112 of the system 100 receiving notifications for the operator. Relevant data for the infrastructure 112 may be displayed on the user interface 128 as a notification to the operator or the mobile wireless device 115 may produce a sound. Non-limiting examples that result in a notification on the infrastructure 112 may be a structural bottle neck in a traffic flow due to a condition of the infrastructure 112, a presence on an obstacle on a path of the machine 108, or a presence of deficiencies in the path used with the machine 108.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for data collection and analysis using a multi-level network, the steps of the method comprising:
    providing a central network;
    providing a vehicle, an infrastructure, and a warehouse management system in communication with the central network, the vehicle, infrastructure, warehouse management system and the central network forming the multi-level network;
    receiving at the vehicle a first data;
    performing a first data fusing process using the vehicle based on the first data to generate a second data, wherein the step of performing the first data fusing process using the vehicle generates a virtual sensor;
    communicating the second data from vehicle to the central network;
    performing a second data fusing process using the central network based on the second data from the vehicle to generate a third data; and
    communicating the third data from the central network to the vehicle;
    performing a third data fusing process using the vehicle based on the third data from the central network to generate a fourth data.

2. A method for data collection and analysis according to claim 1, wherein at least one of the data fusing processes uses a Kalman filter style algorithm.

3. A method for data collection and analysis according to claim 1, wherein the vehicle comprises a sensor for collecting the first data.

4. A method for data collection and analysis according to claim 1, wherein the sensor forms a portion of a mobile wireless device in communication with the vehicle.

5. A method for data collection and analysis according to claim 1, wherein the step of performing the first data fusing process using the vehicle is based on at least one of the first data, a reference data, and a fifth data provided by the central network.

6. A method for data collection and analysis according to claim 5, wherein the fifth data provides at least one of a dynamic reference data, information concerning the infrastructure, information concerning the warehouse management system, information concerning the vehicle, information concerning an operator of the vehicle, and a request for a task to be performed by the operator.

7. A method for data collection and analysis according to claim 1, wherein the step of performing the second data fusing process uses a fifth data.

8. A method for data collection and analysis according to claim 7, wherein the fifth data is provided by at least one of the central network, the infrastructure and the warehouse management system.

9. A method for data collection and analysis according to claim 1, wherein the virtual sensor provides information about at least one of a position, a speed, a task and a service information of the vehicle.

10. A method for data collection and analysis according to claim 1, wherein the step of performing the third data fusing process is performed using a mobile wireless device in communication with the vehicle.

11. A method for data collection and analysis according to claim 1, wherein the fourth data is at least one of an actuator engagement signal, information regarding vehicle monitoring, information regarding vehicle productivity, and information regarding vehicle service.

12. A method for data collection and analysis according to claim 1, wherein the fourth data is a notification for an operator of the vehicle.

13. A method for data collection and analysis according to claim 12, wherein the notification for the operator is at least one of a task list for an operator, a warning regarding an obstacle, information regarding an optimized route, and a warning regarding a speed of the vehicle.

14. A system for data collection and analysis using a multi-level network, the system comprising:
a vehicle configured to receive a first data and perform a first data fusing process based on the first data, the first data fusing process generating a second data, wherein the step of performing the first data fusing process using the vehicle generates a virtual sensor; and
a central network in communication with the vehicle, an infrastructure, and a warehouse management system, the vehicle, infrastructure, warehouse management system and the central network forming the multi-level network, the central network receiving the second data from the vehicle, the central network configured to perform a second data fusing process based on the second data to generate a third data, wherein the third data is communicated to the vehicle so that the vehicle can perform a third data fusing process based on the third data to generate a fourth data.

15. The system for data collection and analysis according to claim 14, wherein at least one of the data fusing processes uses a Kalman filter style algorithm.

16. The system for data collection and analysis according to claim 14, wherein the vehicle comprises a sensor for collecting the first data.

17. A system for data collection and analysis using a multi-level network, the system comprising:
a vehicle configured to receive a first data and perform a first data fusing process based on the first data, the first data fusing process generating a second data;
an infrastructure configured to receive a third data and perform a second data fusing process based on the third data, the second data fusing process generating a fourth data;
a warehouse management system configured to receive a fifth data and perform a third data fusing process based on the fifth data, the third data fusing process generating a sixth data; and
a central network in communication with the vehicle, the infrastructure, and the warehouse management system to form the multi-level network, the central network receiving at least one of the second data, the fourth data, and the sixth data; the central network configured to perform a fourth data fusing process based on at least one of the second data, the fourth data, and the sixth data to generate a seventh data, wherein the seventh data is communicated to at least one of the vehicle, the infrastructure, and the warehouse management system so that the at least one of the vehicle, the infrastructure, and the warehouse management system can perform a fifth data fusing process based on the seventh data to generate an eighth data.

* * * * *